US007738010B2

(12) United States Patent
Kandleinsberger et al.

(10) Patent No.: US 7,738,010 B2
(45) Date of Patent: Jun. 15, 2010

(54) DIGITAL CAMERA WITH OVERSCAN SENSOR

(75) Inventors: Robert Kandleinsberger, Munich (DE); Tran Quoc Khanh, Munich (DE); Michael Koppetz, Munich (DE); Hermann Popp, Munich (DE)

(73) Assignee: Arnold & Richter Cine Technik GmbH & Co. Betriebe KG (DE)

( * ) Notice: Subject to any disclaimer, the term of this patent is extended or adjusted under 35 U.S.C. 154(b) by 1215 days.

(21) Appl. No.: 10/355,939

(22) Filed: Jan. 31, 2003

(65) Prior Publication Data

US 2003/0202106 A1 Oct. 30, 2003

(30) Foreign Application Priority Data

Apr. 24, 2002 (DE) ............................... 102 18 313

(51) Int. Cl.
*H04N 5/225* (2006.01)

(52) U.S. Cl. .............................. 348/207.99; 348/220.1

(58) Field of Classification Search ............. 348/240.2, 348/240.1, 240.3
See application file for complete search history.

(56) References Cited

U.S. PATENT DOCUMENTS 5,060,074 A 10/1991 Kinugasa et al.
5,122,881 A * 6/1992 Nishizawa et al. .......... 348/301
6,252,989 B1 6/2001 Geisler et al.
6,305,853 B1 10/2001 Bishay et al.
6,307,590 B1 * 10/2001 Yoshida ...................... 348/340
6,356,664 B1 3/2002 Dunn et al.
6,566,647 B1 * 5/2003 Spears ........................ 250/226
6,669,099 B2 * 12/2003 Fujimura et al. ............ 235/492
6,757,018 B1 * 6/2004 Fowler ....................... 348/301
6,809,766 B1 * 10/2004 Krymski et al. ............. 348/296

(Continued)

FOREIGN PATENT DOCUMENTS

DE 36 03 552 C2 9/1987

(Continued)

OTHER PUBLICATIONS

German Patent Office Search Report—Aug. 14, 2002, for DE 102 18 313.9.

(Continued)

*Primary Examiner*—Luong T Nguyen
(74) *Attorney, Agent, or Firm*—Amster, Rothstein & Ebenstein LLP

(57) ABSTRACT

The invention relates to a digital motion picture camera comprising at least one optoelectronic sensor device for the recording of motion pictures. The sensor device has, in an areal arrangement, a plurality of sensor elements for the production of a respective received signal in dependence on a light exposure. The camera further has a control device for the controlling of the read-out of the received signals of the sensor elements as well as a digitizing device for the digitizing of the received signals. A part of the sensor elements is associated with a central areal region of the sensor device for the production of received recording signals and another part of the sensor elements is associated with a frame-shaped areal region of the sensor device for the production of received monitoring signals, said frame-shaped areal region surrounding the central areal region.

38 Claims, 4 Drawing Sheets

U.S. PATENT DOCUMENTS

| | | | | |
|---|---|---|---|---|
| 6,882,368 | B1 * | 4/2005 | Suda | 348/340 |
| 6,906,746 | B2 * | 6/2005 | Hijishiri et al. | 348/240.2 |
| 6,975,355 | B1 * | 12/2005 | Yang et al. | 348/308 |
| 7,050,142 | B2 * | 5/2006 | Valenzuela et al. | 352/27 |
| 7,110,027 | B2 * | 9/2006 | Wyman | 348/231.9 |
| 7,142,237 | B2 * | 11/2006 | Nozawa | 348/240.2 |
| 2001/0030696 | A1 | 10/2001 | Glenn | |
| 2001/0030698 | A1 | 10/2001 | Glenn | |
| 2002/0126211 | A1 * | 9/2002 | Kitajima | 348/220.1 |
| 2004/0081437 | A1 * | 4/2004 | Asada et al. | 386/131 |

FOREIGN PATENT DOCUMENTS

| | | | |
|---|---|---|---|
| DE | 40 01 072 | A1 | 7/1991 |
| DE | 41 23 203 | C1 | 10/1992 |
| DE | 41 28 185 | A1 | 2/1993 |
| DE | 42 19 331 | A1 | 12/1993 |
| DE | 43 14 506 | A1 | 3/1994 |
| DE | 35 34 187 | C2 | 6/1994 |
| DE | 43 28 783 | C2 | 5/1996 |
| DE | 196 52 477 | A1 | 6/1998 |
| DE | 694 15 876 | T2 | 8/1999 |
| DE | 197 82 036 | T1 | 10/1999 |
| DE | 695 09 475 | T2 | 11/1999 |
| DE | 100 51 881 | A1 | 10/2001 |
| DE | 100 26 596 | C1 | 12/2001 |
| DE | 100 33 751 | A1 | 1/2002 |
| EP | 0 712 236 | A1 | 5/1996 |
| JP | 02014675 | | 1/1990 |
| WO | WO 96/31050 | | 10/1996 |
| WO | WO 98/51075 | | 11/1998 |
| WO | WO 00/51345 | | 8/2000 |

OTHER PUBLICATIONS

Jacoby et al., "Electronics in the New Generation of Arriflex Cameras." SMPTE Journal 100:880-883 (Nov. 1991).

Fossum, "CMOS Image Sensors: Electronic Camera-On-A-Chip." IEEE Transactions on Electron Devices 44, 10:1689-1698 (Oct. 1997).

Stough et al., "High-Performance Electro-optic Camera Prototype." SMPTE Journal, 140-146 (Mar. 2001).

Weber, "Frame-Transfer-CCD-Sensoren mit HD-DPM+-Technik in einer HD-Anwendung." Fernseh- und Kino-Technik—55. Jahrgang—Nr. 758-761 (Dec. 2001).

Erkelenz, "Digitale Kinematographie—mehr als 24p." Fernseh- und Kino-Technik—56, Jahrgang—Nr. 127-132 (Mar. 2002).

European Search Report dated May 30, 2005 for European Application No. 03 003 434.2 and English translation thereof.

* cited by examiner 11
13
59
63
31
32
33
35
37
39
42
43
45
47
49

DIGITAL CAMERA WITH OVERSCAN SENSOR

RELATED APPLICATIONS

This application corresponds to and claims foreign priority benefits under 35 U.S.C. 119 (a)-(d) and (f) or 365 (b) based upon Germany patent application No. 102 18 313.9 filed Apr. 24, 2002.

BACKGROUND OF THE INVENTION

The invention relates to a motion picture camera for full motion recordings of high picture quality such as television movies, cinema commercials, cinema movies or even industrial or medical applications. Motion picture cameras for the exposure of a photochemical negative film are known for such recordings. This recording technology allows a high resolution, large brightness dynamics and good color rendering. However, the development and the printing of such a negative film are undesirably complex and/or expensive since specialist equipment is required. Furthermore, it is required for an electronic picture processing, which has become customary in the meantime—for example for the changing of the color or for the insertion of synthetic picture elements—to subsequently digitize the exposed film material.

Digital video cameras are also known which record the recorded pictures with three CCD sensors provided for different colors and store them in a digital format on magnetic tape. The recording is observed by means of an electronic viewfinder in the form of an integrated display monitor which reproduces the recorded pictures recorded by means of the CCD sensors. Such cameras therefore have the advantage that the recorded film pictures are already present in digital form. However, such video cameras do not satisfy the demands occurring in all typical recording situations with respect to handling and picture quality and they are consequently not used in full motion recordings in which a particularly high picture quality is desired. For example, such a camera design with three CCD sensors requires recording lenses with a comparatively long back focal length, which is disadvantageous for the imaging performance of the optical systems. Furthermore, splitter prisms are required in the optical reception path which can likewise result in an unwanted reduction in the recording quality.

SUMMARY OF THE INVENTION

It is an object of the invention to provide a motion picture camera which allows a digital recording of motion pictures, on the one hand, and is suitable for use for full motion recordings of high picture quality, such as television movies, cinema commercials or cinema movies, on the other hand.

This object is satisfied by a digital motion picture camera which has at least one optoelectronic sensor device for the recording of motion pictures, a control device for the control of a read-out of the received signals of the sensor elements and a digitizing device for the digitizing of received signals of the sensor elements, with the sensor device having a plurality of sensor elements in an areal arrangement for the production of a respective received signal in dependence on a light exposure, and with a part of the sensor elements being associated with a central areal region of the sensor device for the generation of received recording signals and with another part of the sensor elements being associated with a frame-shaped area region of the sensor device which surrounds the central areal region for the generation of received monitoring signals.

In the motion picture camera in accordance with the invention, a sensor device is therefore provided having a plurality of photoelectrical sensor elements which each produce an electrical received signal. These received signals are digitized while still in the camera, optionally after amplification, so that the picture information is present directly in a digital format and can thus be electronically processed without problem and can be reproduced without substantial loss of quality.

In this camera, the sensor elements of the sensor device are associated with different pre-determined or pre-determinable areal regions, with a part of the sensor elements being associated with a central areal region, with the received signals of these sensor elements being used for the long-term picture storage—that is for the actual recording of the recorded pictures—(received recording signals). Another part, or all other, sensor elements are associated with a frame-shaped areal region surrounding the central areal region. The received signals of these sensor elements (received monitoring signals) can—in addition to the received recording signals—be used for the observation and monitoring of the actual recording (so-called “over-scan”).

The explained different association thus corresponds to a division of the motion picture to be recorded into a central picture region which has ultimately to be stored for the production of the motion picture film and into an outer picture region provided only for the control observation. The motion picture camera in accordance with the invention thereby makes possible an observation of the recording beyond the central picture region taken into account for the production of the motion picture film. For this, the corresponding received monitoring signals can be supplied together with the received recording signals of the central areal region to a display unit, for example to a display unit serving as an electronic viewfinder, in particular an integrated display monitor.

The cameraman can thus see a larger picture region than the actually stored picture section. The observation of an outer picture region is thereby made possible—without the necessity of a purely optical view-finder—to be able to recognize objects at the picture margin in good time which should not be recorded by accident and to be able to move the recorded central picture section of the camera away from such objects in a correspondingly early manner. In this manner, for example, an unintentional recording of a microphone at the margin of the picture section can be recognized and prevented in good time.

An advantage of the explained division of the sensor elements thus consists of the fact that a control observation of an outer picture section which is ultimately not to be recorded is possible without an optical viewfinder or a control photosensor being required for this purpose in addition to the anyway required sensor device.

The said display unit is preferably integrated into the motion picture camera in order always to allow the cameraman guiding the camera a direct observation of the motion pictures recorded and of the ultimately not recorded picture surrounds.

Alternatively or additionally, a display unit can be provided which is not arranged directly at the motion picture camera, but is connected to this for the transmission of the received monitoring signals and of the received recording signals. A recording observation is thereby also possible at a location remote from the motion picture camera if the camera is attached, for example, to a crane. In such a case, a coupling of the display unit to the camera can take place, for example, via cable or via a wireless connection.

In accordance with an advantageous embodiment, the said display unit is coupled to a picture generator by which a cutting frame signal can be produced and transmitted to the display device which appears on the display device as a cutting frame to distinguish the central, ultimately stored, picture region and the frame-shaped picture region only provided for control purposes. The picture generator can additionally be used to represent specific recording parameters, for example the actual aperture setting of the recording lens, on the display device. Alternatively to the use of a picture generator, a permanent physical marking of the boundary between the central picture region and the frame-shaped picture region can also be provided at the display device.

The sensor elements can preferably be controlled by the control device such that the received recording signals and the received monitoring signals can optionally be read-out separately.

Different interfaces can be associated with the sensor elements of the central areal region and with the sensor elements of the surrounding frame-shaped areal region in order either to allow a transmission of the received signals both to a memory device and to a, display device or to allow a transmission of the received monitoring signals only to the display device. In particular, one interface for the transmission of the received recording signals to a memory device and one interface for the transmission of the received recording signals to a display device can be associated with the central areal region, with these two interfaces also being able to be formed by a single common interface if a corresponding splitting of the received recording signals should take place at a downstream position of the signal processing.

A connection of the sensor elements to a memory device and to a display device is preferably provided such that the received signals of all sensor elements can be read out during a read-out run, with the received recording signals being transmitted to the memory device and to the display device and the received monitoring signals only being transmitted to the display device.

The transmission of the received monitoring signals to the display device can take place serially, in parallel or only group-wise in parallel, preferably in agreement with the kind of transmission of the received recording signals to the memory device.

The received recording signals are transmitted to the memory device in digitized form. The transmission of the received monitoring signals to the display device can take place in analog form, with the display device being connected to the sensor elements of the central areal region at a position still before the digitizing device so that no digitizing device at all is required for the sensor elements of the frame-shaped areal region. The transmission of the received signals to the display device can alternatively take place in digital form so that the display device—for example together with a memory device—is connected to the output of a digitizing device. In this manner, a check can additionally be made using the display device of whether the digitizing of the received signals has taken place in a satisfactory manner.

In a possible embodiment, the connection of the sensor elements is selected such that the division into the central areal region and into the frame-shaped areal region is permanently fixed. The invention can, however, also be realized particularly well by the use of a sensor device whose sensor elements can be freely selectably controlled by means of the control device such that the received signals can be produced and read out in any desired order or at any desired points in time. It is thereby possible, for example, to record particular picture sections or to determine a plurality of received signals—for example for different exposure times—for control purposes with respect to specific sensor elements. It is moreover possible to vary the association of the sensor elements with the central areal region or with the frame-shaped areal region in order to change the size and/or the shape of the areal regions. A freely selectable read-out of the sensor elements is in particular possible with the use of a CMOS sensor.

In accordance with an advantageous further development of the invention, the sensor elements of the outer frame-shaped areal region are provided in a lower resolution or with otherwise reduced reproduction properties than the sensor elements of the central areal region of the sensor device. The sensor elements of the frame-shaped areal region namely only serve, as explained, for the control observation, but not for the actual recording of the motion picture. A reduced resolution in the outer picture region therefore does not make itself noticeable in the stored motion picture and can also be negligible for the control observation, in particular if the resolution of the sensor elements of the frame-shaped areal region is not worse than the resolution of the display unit used which is always limited in practice.

The recording optical system used is normally anyway only optimized to the size of the ultimately recorded or stored motion picture, that is to the size of the central areal region of the sensor device. The recording optical system nevertheless actually does also image regions outside the central picture region, but only with reduced imaging properties. The design of the sensor elements of the outer frame-shaped areal region with reduced resolution thus does not necessarily result in large restrictions with respect to the control observation of the recording than are anyway predetermined by the outer region of the recording optical system. It is therefore particularly economical for the extent of the central areal region of the sensor device exactly to correspond to a central region within the picture plane for which the imaging properties of the recording optical system of the motion picture camera are optimized.

In contrast, such a reduced resolution in the outer picture region can contribute to making possible a more cost favorable manufacture of the sensor device, of the associated data interfaces and/or of the associated read-out electronics and to reducing the comparatively high data flow of the received signals of the sensor device to be read out.

The resolution of the sensor device can be reduced within the frame-shaped areal region in a spatial respect. The sensor elements can, for example, be arranged within the frame-shaped areal region in a lower density than in the central areal region, that is with a lower number of sensor elements per surface unit.

Alternatively or additionally, a lower sensitivity or brightness resolution can be provided within the frame-shaped areal region of the sensor device than in the central areal region.

The resolution of the frame-shaped areal region can also be lower than in the central areal region in a color respect. The color reproduction is namely of subordinate significance for the explained purpose of the control observation for possibly intruding objects at the picture margin. In extreme cases, it can be sufficient for the sensor elements of the frame-shaped areal region only to be designed for a monochromatic recording.

Alternatively or additionally, the sensor device can have a reduced time resolution within the frame-shaped areal region. In this case, the maximum frequency at which the sensor elements of the frame-shaped areal region can be read out, and consequently a complete outer picture frame can be recorded, is lower than in the central areal region. This restriction is also of subordinate significance for the explained purpose of the control observation for possibly intruding objects at the picture margin. This applies in particular to the case of a slow motion recording in which the motion picture actually to be stored within the central areal region is recorded at an increased picture recording frequency, for example at 100 frames per second. For the pure control observation of such a slow motion recording, in contrast, a customary picture recording frequency, for example of 24 frames per second, is sufficient.

The aforesaid different kinds of reduced resolution can be combined in any desired manner to achieve a cost favorable manufacture of the sensor device, on the one hand, and a sufficient control reproduction of the recorded picture, on the other hand. For example, sensor elements can be provided in the frame-shaped areal region which have a comparatively low sensitivity per se (low dynamic resolution), with this low sensitivity being at least partly compensated in that these sensor elements have a comparatively large areal extent and are therefore only arranged in a relatively low density (low spatial resolution).

In accordance with a further advantageous embodiment of the motion picture camera in accordance with the invention, said motion picture camera only has a single optoelectronic sensor, in particular the already named CMOS sensor. When a single sensor is used for all colors, the upstream beam splitter required when a plurality of sensors are used can be omitted. An improvement in the picture quality is thereby achieved. The omission of the beam splitters furthermore has the effect that the distance of such a single sensor from the recording optical system can be reduced such that higher quality optical systems can be used.

To make possible a distinguishing of colors with a single sensor in such an embodiment, each sensor element can be provided with a color filter, in particular with a red, green or blue filter. Each sensor element thus receives a signal associated with a picture element, said signal, however, only corresponding to the picture information of a single color. The further color information for this picture element is calculated from the received signals of the adjacent sensor elements provided with different color filters. Alternatively, the color of a filter associated with the sensor element can be changed in a faster time sequence in order thus to obtain all color information.

It is, however, also possible to use a color-sensitive sensor device, for example a semi-conductor sensor which has different spectral absorption at different depths. Each sensor element corresponding to a picture element can thereby generate a plurality of received signals which correspond to different wavelength ranges or colors. For example, such a color resolving sensor element can produce a red, green or blue received signal.

Alternatively to this, two or three sensors can also be provided for the realization of different spectral sensitivities.

In accordance with an advantageous further development of the invention, the frequency at which the sequential motion pictures are recorded can be varied, and indeed in a manner pre-settable by the user. The pictures can thereby be recorded at a different frequency to the one they should ultimately be reproduced at as a motion picture film. This variability of the picture recording frequency allows fast motion shots which are desired, for example, for action scenes or for procedures which take place extremely slowly in order to make an action procedure appear faster than it actually takes during the recording. Furthermore, the variability of the picture recording frequency allows slow motion shots such as are likewise customary and desired for many full-motion recordings.

It is important for this further development that these advantages are achieved by a change in the frequency at which the sequential motion pictures are recorded and that the desired fast motion effects or slow motion effects are accordingly not produced by subsequent time interpolation of individual motion pictures. Interpolation artifacts are thereby avoided which can occur on the interpolation of motion pictures which have been recorded at a constant frequency such as is the case, for example, with the initially named CCD sensors.

It is, in contrast, unimportant for the realization of the explained further development whether the motion pictures are recorded as full frames or as half frames.

With this further development, the possibility is therefore provided of a deviation of the ongoing picture recording frequency from a base value of, for example, 24 frames per second (fps). This means that the individual recorded motion pictures have an increasing phase shift with respect to this base value of the picture recording frequency.

The said variation of the picture recording frequency can, for example, be realized in that the starting point in time of the exposure of the sensor elements, that is the starting point in time of the light exposure or the point in time of the actual start of the received signal production on the basis of a light release, takes place by a corresponding control at different points in time or phase positions. The resetting or cancellation of a photoelectric sensor element can in particular take place at a point in time pre-settable by the control device.

Alternatively or additionally, the picture recording frequency can be varied in that the control device causes the end of the exposure of a photoelectric sensor element at different points in time. This measure in particular results in different picture taking frequencies when the start of the exposure of a following motion picture does not take place in accordance with a fixed time pattern, but only in time reference to the (variable) end point in time of the previous exposure.

In both cases, or by combination of these two control measures, a phase shift of the picture recording with respect to a base value of the picture recording frequency is therefore achieved, with simultaneously a variation of the length of the exposure time being possible.

The desired variation of the picture recording frequency can also be realized in that the rate or frequency is varied at which the received signals of the individual sensor elements are sequentially reset or read out. In other words, a sequential read out of the received signals of the sensor elements in accordance with a read-out cycle can be provided, with ultimately one single picture being recorded by the sequential read-out of all received signals. A fixed time pattern, and thus a specific base value of the picture recording frequency, can be deviated from by variation of this read-out cycle.

As regards the order of the read-out of the photoelectric sensor elements, it is possible for the control device first to sequentially cause a resetting or cancellation of all sensor elements and subsequently to sequentially read out the received signals of the sensor elements, that is to forward them to an amplification device and/or to the digitization device. In such a case, the already mentioned variation of the starting point in time and/or of the end point in time of the exposure is particularly suitable to realize the desired variation of the picture recording frequency.

Alternatively to this sequential read-out of the sensor elements, provision can also be made for the received signals of the photoelectric sensor elements to be read out in parallel or at least group—wise in parallel—for example divided according to the explained different areal regions of the sensor device. This simplifies the realization of particularly high picture recording frequencies. The picture recording frequency can be varied here in that the sensor elements, or a group of sensor elements, are reset together at variable points in time and/or are read out at variable points in time.

The sensor device and the control device are preferably designed for a continuous variability of the picture recording frequency, for example by a continuous variability of the read-out cycle of the sensor elements. Alternatively to this, a variability of the picture recording frequency can be provided in pre-determined frequency steps, for example in that the picture recording frequency is changed in units of the read-out cycle with which the photoelectric sensor elements are read out sequentially. For example, after a sequential or simultaneous read-out of all sensor elements, it is possible to wait for the length of a pre-settable continuously variable or discretely variable waiting interval until the sequential read-out, or optionally the resetting of the sensor elements required for this, is begun again.

Each sensor element of the sensor device can, as already mentioned, have its own amplifier device for the amplification of the respective received signal and/or its own digitizing device associated with it. It is preferred in this case for the amplifier device or the digitizer device to be already integrated in the sensor device or in the corresponding semiconductor component. For example, amplifiers and/or analog/digital converters can be integrated at the rear side of a photoelectric surface containing the sensor elements in a three-dimensional design of the sensor device.

Alternatively to this, it is also possible to provide a single amplifier device or at least a single digitizing device together for a plurality of, or all, sensor elements.

A particularly simple realization of the invention is possible by designing the sensor device in a CMOS design or in a related technology. Such a sensor allows the explained flexible variation of the picture recording frequency and it permits a read-out of the sensor elements at a comparatively high read-out cycle and thus at a high picture recording frequency. The picture recording frequency can thereby ultimately be varied within an advantageously large frequency range In the motion picture camera in accordance with the invention, as already mentioned, a purely electronic control of the picture recording frequency or of the exposure time of the sensor device can be provided, with the exposure time of the individual sensor elements, that is the starting point in time and/or the ending point in time of the received signal formation, being able to be controlled by means of the control device together for all, or for a part of the sensor elements or for each sensor element individually. It is ensured in the first case that the same exposure time is provided for all sensor elements such that the brightness values and color values of the motion picture recorded are recorded faithful to the original. A common control of only a part of the sensor elements, or an individual control of all sensor elements independently of one another, in contrast, allows the production of received signals on the basis of different exposure times with respect to different sensor elements such that, for example, picture regions already identified as of comparatively low contrast can be recorded with a matched exposure time in order to nevertheless achieve a sufficiently large data depth for such picture regions.

Alternatively or additionally to the purely electronic control of the exposure time, a diaphragm device can be disposed upstream of the sensor device which allows an adjustment or limitation of the exposure time of the sensor device. Such a diaphragm device can, for example, have a rotationally movable rotational diaphragm which has one or more masking regions and one or more transmission apertures which are in particular circular in shape. The sensor device is alternately exposed to received light or masked by a rotational drive of such a rotational diaphragm.

Within the context of a further advantageous further formation of the invention, it is possible to control the sensor elements by means of the control device such that a plurality of received signals are produced sequentially which correspond to different exposure times and are assigned to a single motion picture to be recorded. In particular after the start of the exposure of a reception element, that is after the required resetting or cancellation of this reception element, the received signal accumulated in each case in the meantime can be taken up at a plurality of sequential points in time without a repeated resetting or cancellation of accumulated charge taking place.

A plurality of received signals are therefore produced for the same sensor element and for the same motion picture at defined points in time by such a control. If the received signal is located in a saturation region of the sensor device for the actually desired exposure time, the correct received signal value can still be determined subsequently by calculation by extrapolation on the basis of the further received signals corresponding to a shorter exposure time. It is likewise possible, for the avoidance of under-exposure—that is for the avoidance of a non usable received signal—to expose the sensor device as a precaution for a longer time and to determine by calculation the correct signal value for such sensor elements for which the longer exposure results in overexposure by additional read-out of received signals with respect to shorter exposure times.

A CMOS sensor is particularly suitable for this type of control since the received signals of the individual sensor elements can be read out free of destruction, that is in a signal maintaining manner, for example in the form of current voltage values. It has moreover been found to be of advantage with a CMOS sensor that this allows comparatively high read-out rates. No significant time loss is associated with the explained repeated signal gain since ultimately a comparatively long exposure time is set as a precaution for each sensor element, for which, however, a plurality of read-out processes take place.

Furthermore, a cooling device can be provided for the active cooling of the sensor device which comprises, for example, a Peltier element or a fan.

In a preferred embodiment, the motion picture camera in accordance with the invention has at least one digital memory device for the storing of the recorded and digitized received recording signals. Such a memory device can preferably be coupled to the camera in an exchangeable manner to allow a fast replacement. The said digitizing device is connected to the memory device via at least one data interface for the forwarding of the respectively digitized received recording signals, with a number of data interfaces preferably being provided which corresponds to the number of the digitizing devices.

The storage of the received recording signals in the memory device preferably takes place with a large bandwidth, that is without a reduction of the data acquired in the picture recording. In other words, a large memory requirement is accepted so as not to risk any irreversible loss of motion picture data due to data compression or to picture treatment such as color or brightness modifications. A possible data compression or picture treatment should only take place using a copy of the original recorded data stored in the memory device.

In accordance with a preferred embodiment, the memory device can be controlled by the control device for an additional storage of at least one recording parameter in order to store the actual picture recording frequency, the actual diaphragm setting of the recording lens or text information on the recorded film scene (take), for example, with the motion picture data. Such recording parameters can be used for documentation purposes or for a corresponding setting of the camera for a later restart of the shoot.

Furthermore, the motion picture camera in accordance with the invention can be fitted with a clock which makes available a time signal which can be stored together with the motion picture data or with recording parameters in order to allow an association of these data with defined points in time.

Furthermore, an identification device can be provided by the memory device which allows the transmission of an identification code corresponding to this memory device to the motion picture camera. The control device of the camera can thereby, for example, recognize an exchange of the memory device, the total capacity or the still remaining capacity of the memory device. A further application possibility of such an identification device consists of the fact that recording parameters previously transmitted to the memory device can again be loaded back into the camera in order, for example, to allow an automatic adjustment of the camera in accordance with an earlier setting. The said identification device can, for example, have a microcontroller and a non volatile memory.

One difficulty in the obtaining of the received signals with a high data depth and a correspondingly high data rate is that the memory device has to have a capacity sufficient for the usual recording periods. The memory device must therefore be fitted either with a comparatively large capacity or a change of the memory device must be possible during the ongoing recording.

In a further advantageous embodiment, no physical coupling is therefore provided between the camera and the memory device, but the motion picture data or recording parameters to be stored are transmitted to the memory device in a wireless manner. For this purpose, the motion picture camera can have a wireless transmitter and the memory device can have a corresponding wireless receiver. This embodiment has the advantage that the construction size of the memory device or of a plurality of memory devices to be used does not limit the handling of the camera. The weight of the camera can also be considerably reduced in this manner.

Moreover, such a wireless coupling of memory devices to the motion picture camera can simplify an interruption free change of the memory devices at the motion picture camera so as not to prematurely have to end a film recording or to lose picture data due to the depleted capacity of a single memory device. Such an interruption free change of the data transmission to a plurality of memory devices in succession can take place, for example according to the principle of "roaming", such as is known in connection with the change of a transmitter/receiver station with mobile radio telephones.

It is alternatively or additionally preferred for an intermediate memory device to be provided which serves as a data buffer in order, ultimately, to provisionally record data to be stored in a memory device and to transmit them to said memory device. Such an intermediate memory device is—for the benefit of increased data security—in particular of advantage on an exchange of memory devices during a running film recording. For example, such an intermediate memory device can be provided by the motion picture camera or by a memory device arranged remotely from the camera in the case of the explained wireless transmission of data to be stored to different memory devices.

It must still be noted with respect to the explained memory device that this can have at least one output interface for the outputting of the stored data. This output interface can also be made, for example, as a wireless transmitter in order to allow a wireless transmission of the data.

In an advantageous embodiment, the memory device can be controlled for the outputting of the stored data at an output rate which is different from the rate of the reading in of the data to be stored, for example to allow a subsequent backup of the data in a—comparatively slow—magnetic tape memory.

The memory device can in particular have a magnetic memory (for example a hard disk), an optical memory (for example a recordable CD or DVD or a holographic memory), a magneto-optical memory, a semi-conductor memory (for example a RAM memory or a flash memory) or a plurality or a combination of these storage media.

Finally, it is preferred for the motion picture camera to have a modular design in order to allow a simple and fast replacement of electronic, optical and mechanical modules and in order furthermore to allow the use of conventional camera components. In particular, the sensor device together with the control device, further a recording optical system, or a memory device can respectively form its own such modular unit.

BRIEF DESCRIPTION OF DRAWINGS

Further preferred embodiments of the invention are recited in the dependent claims. The invention will be explained in the following by way of example with reference to the drawings in which are shown:

DETAILED DESCRIPTION OF THE INVENTION

Figure 1:
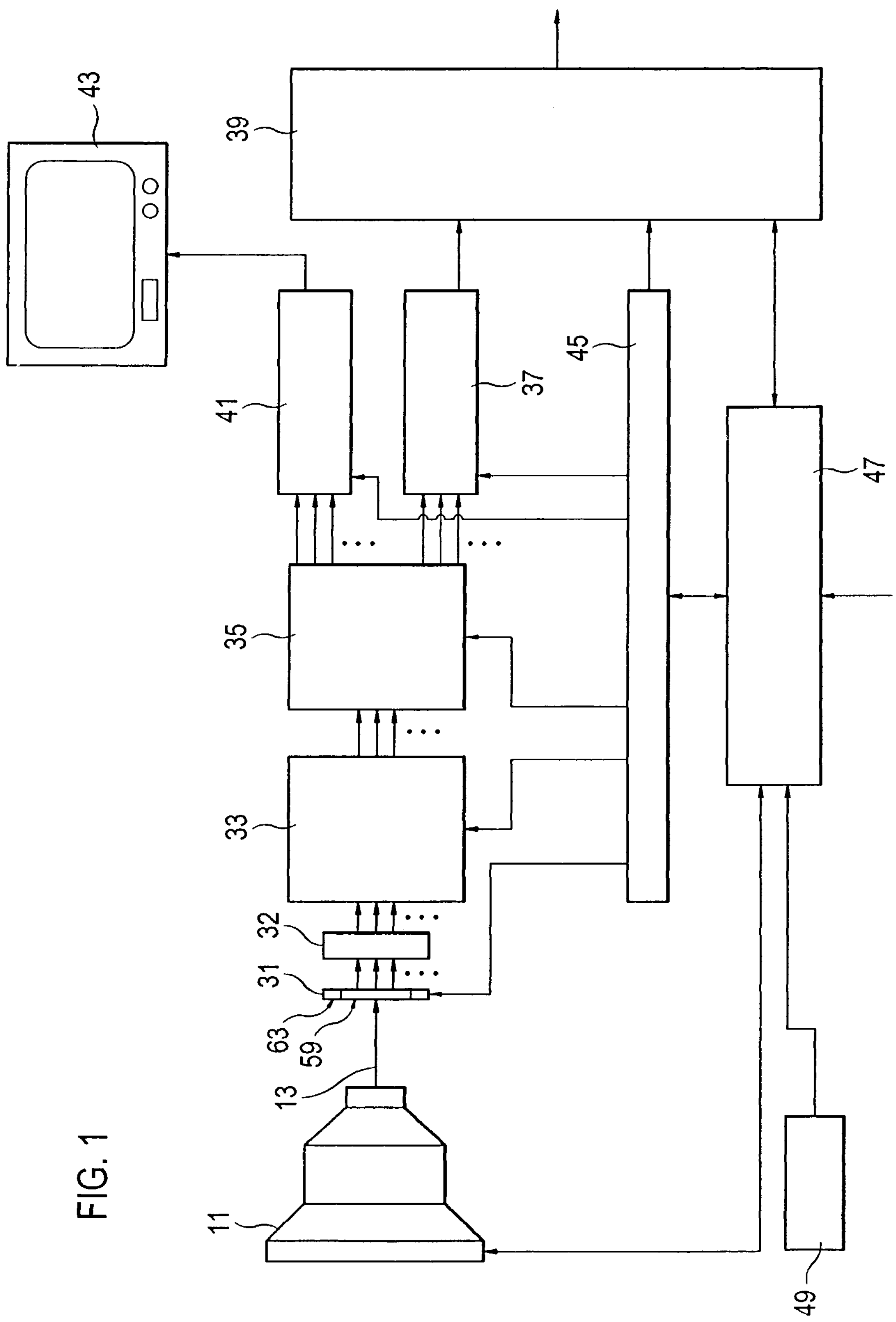
FIGS. 1 and 2 possible embodiments of a motion picture camera in accordance with the invention.

FIG. 1 shows a possible design of the motion picture camera in accordance with the invention. This has a recording optical system 11 which images the motion picture actually to be recorded along a reception beam path 13 on an optoelectronic sensor device 31. In a matrix-like arrangement, the sensor device 31 has a plurality of sensor elements which can, as a consequence of the light exposure, produce a respective received signal which corresponds to the light intensity and the exposure time. For example, the sensor device 31 can have an arrangement of 1920×1080 or 2880×2160 of such sensor elements.

The received signals produced by the sensor device 31 are delivered in parallel, or partly in parallel, to an amplification device 32 which has a corresponding number of electronic amplifiers. The received signals amplified in this manner are digitized in a downstream digitizing device 33 by a corresponding number of analog/digital converters. The digitizing device 33 is connected via a data bus 35 and a data interface 37 to a memory device 39 which records some of the recorded and digitized received signals on, for example, a magnetic hard disk in real time.

The received signals can be delivered via a further data interface 41 connected to the data bus 35 to a display monitor 43 in order to allow a simultaneous observation of the recorded motion picture film on this. The display monitor 43 can be integrated into the camera or be arranged at a location remote from the camera.

The data flow from the sensor device 31 via the amplifier device 32, the digitizing device 33 and the data bus 35 to the data interface 37 and the memory device 39, on the one hand, and to the data interface 41 and the display monitor 43, on the other hand, is controlled by an electronic control device 45 which is connected, for this purpose, to the said components 31, 33, 35, 37, 39, 41, 43. The electronic control device 45 in particular controls the read-out of the received signals of the individual sensor elements of the sensor device 31.

A camera control device 47 is moreover provided which is connected to the recording optical system 11, to the electronic control device 45, to the memory device 39 and, furthermore, to a camera sensor 49 which, for example, detects the brightness of the of the take to be recorded or individual regions therefrom. The camera control device 47 synchronizes the procedure of the digital motion picture recording with the control or signal processing of the further camera components, and it allows the input of setting parameters by the cameraman via a user interface not shown in FIG. 1.

The camera in accordance with FIG. 1 thus forms a digital motion picture camera which allows the recording and storage of picture signal data in a digital format and which simultaneously allows an electro-optical control observation of the recorded data on the display monitor 43.

Figure 3:
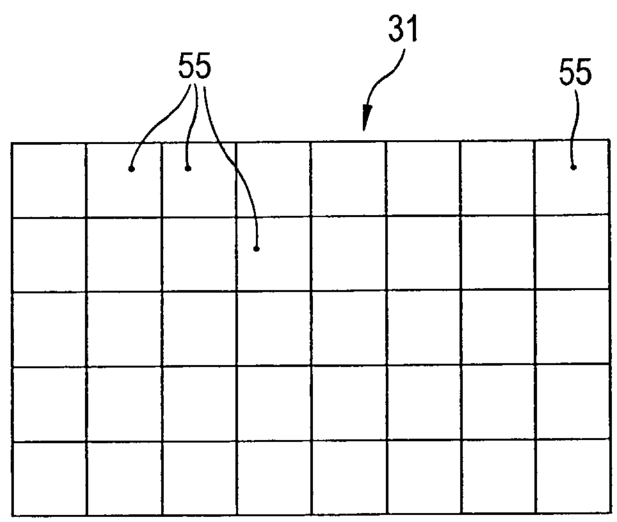
FIGS. 3 and 4 possible embodiments of a sensor device.

FIG. 3 schematically shows a known matrix-shaped division of the light sensitive front side of a sensor device 31 into a plurality of sensor elements 55, with only a low number of sensor elements being shown for a simplified representation.

Figure 4:
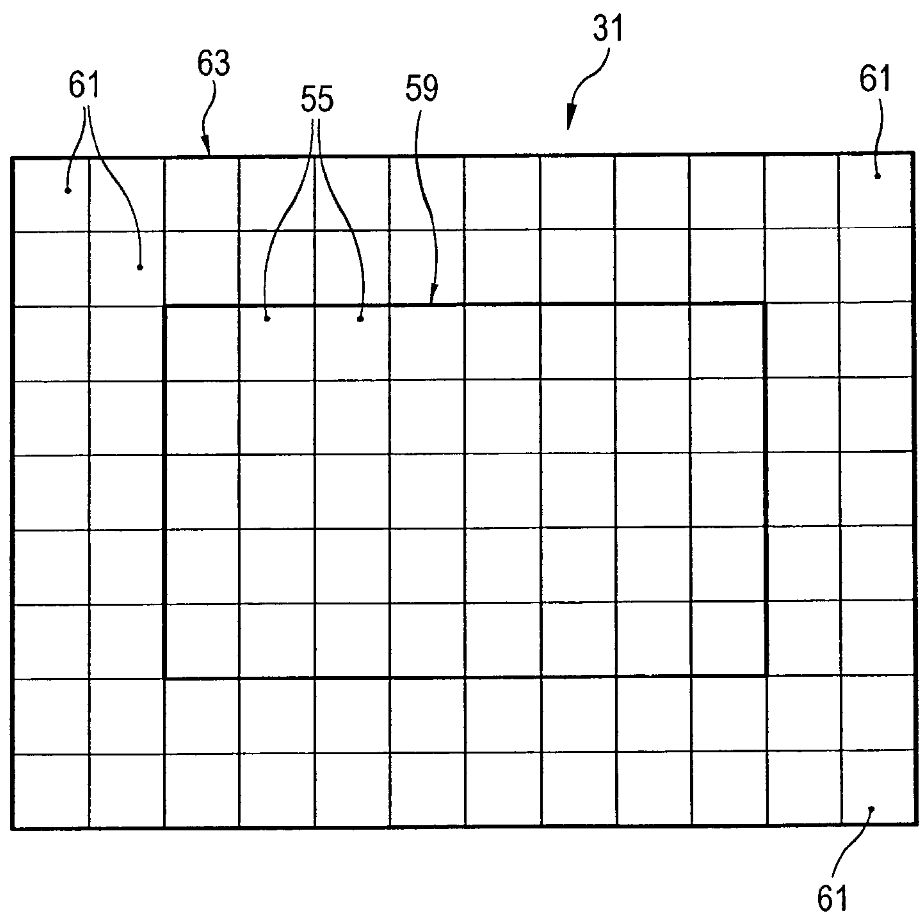

FIG. 4 shows an embodiment of the sensor device 31 of the motion picture camera of the invention in accordance with FIG. 1 in which the sensor elements 55 are associated with a central areal region 59 of the sensor device 31 and additional sensor elements 61 are associated with a frame-shaped areal region 63 which surrounds the central areal region 59. The central areal region 59 has a rectangular outer outline and the frame-shaped areal region 63 has a rectangular inner contour complementary thereto.

This division is used only to make use of the received signals of the sensor elements 55 of the central areal region 59 (received recording signals) for the recording and/or storage of the actual motion picture in the memory device 39. In the camera in accordance with FIG. 1, the memory device 39 is for this purpose only coupled to the sensor elements 55 of the central areal region 59 via the data interface 37.

The received signals of the sensor elements 61 of the frame-shaped areal region 63 (received monitoring signals) can, in contrast, additionally be used together with the received recording signals for an observation of the recorded take on the display monitor 43, with the division of the sensor device 31 into the regions 59, 63 corresponding to a division of the observable picture into a central picture section and a surrounding frame-shaped picture section. The picture which can be observed on the display monitor 43 is thus larger than the actually stored motion picture. For this purpose, in the camera in accordance with FIG. 1, the display monitor 43 is coupled via the data interface 41 to the sensor elements 55 of the central areal region 59 and to the sensor elements 61 of the frame-shaped areal region 63. Due to this expanded observation and monitoring possibility, for example, an accidental recording of a microphone extending into the picture margin can be recognized and prevented in good time.

To sum up, in the motion picture camera shown in FIG. 1, the received signals of all sensor elements 55, 61 of the sensor device 31 are digitized and corrected as necessary. These data are then delivered to the digital data bus 35 which has a high bandwidth. The two (or more) interface switches 37, 41 are connected to the data bus 35 and can be controlled such that only some of the data available at the data bus 35 are transmitted. For example, the data interface 37 can transmit the received recording signals of the central areal region 59 to the memory device 39 in very high resolution, i.e. without information reduction. The data interface 41 also passes on the received monitoring signals of the frame-shaped areal region 63—in addition to the received recording signals—to the display monitor 43, with the data volume being reduced or compressed prior to the passing on to the display monitor 43 in accordance with the resolution of the display monitor 43.

The explained division of the sensor elements 55, 61 into the central areal region 59 and the frame-shaped areal region 63 can take place physically, for example by a different design of the sensor elements 55, 61 in the two areal regions 59 and 63 respectively, in particular using different spatial, dynamic, color and/or temporal resolution. For example, a fixedly preset different connection of the sensor elements 55, 61 within the two areal regions 59 and 63 respectively can also be provided.

Alternatively to such a physical division of the areal regions 59, 63, the whole light sensitive surface of the sensor device 31 can be fitted with similar sensor elements 55, 61, with the association with the central and the frame-shaped areal regions 59 and 63 respectively being set by the read-out or the control of the sensor elements 55, 61 and with the sensor elements 55, 61 of the different areal regions 59, 63 being read out using the same method or different methods.

In both cases of the division, the received recording signals and the received monitoring signals can be directed over separate data paths in order to reduce the effort for the processing of the data volume created, in particular by an early reduction of the data volume provided for the display monitor 43.

Figure 2:
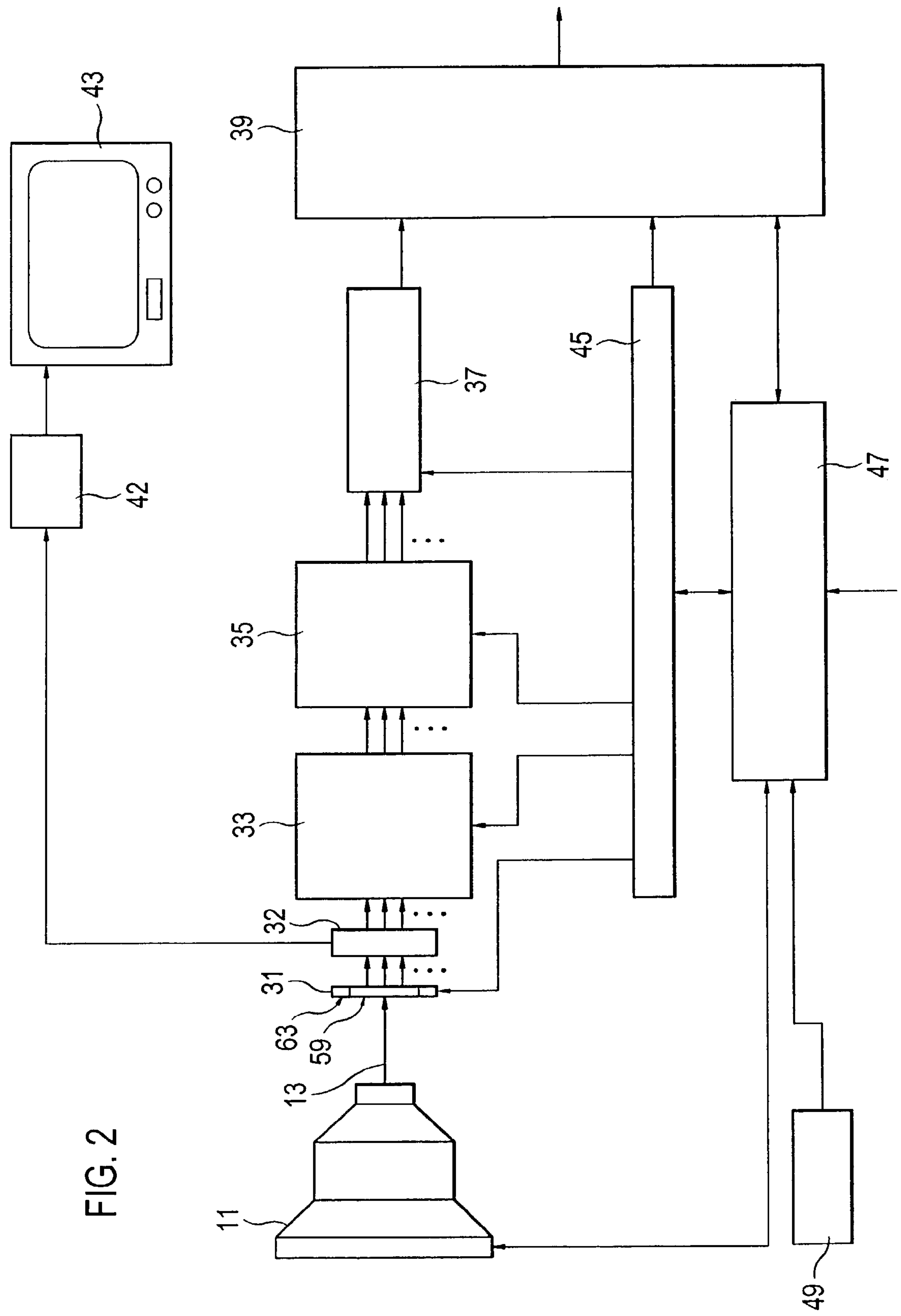

FIG. 2 shows a further embodiment of a motion picture camera in accordance with the invention, with components corresponding to the embodiment in accordance with FIG. 1 being marked with the same reference numerals. Contrary to the embodiment in accordance with FIG. 1, the transmission of the received signals of the sensor device 31 to the display monitor 43 takes place via an analog picture preparation circuit 42 which is connected for this purpose at the input side to the amplifier device 32 and at the output side to the display monitor 43. Accordingly, the display monitor 43 has no data interface of its own (41 in FIG. 1) associated with it for the link to the digital data bus 35.

In the motion picture camera shown in FIG. 2, only the received recording signals of the central areal region 59 are digitized and transmitted to the memory device 39 for storage in digital form via the data bus 35 and the data interface 37. In contrast, the signals of all sensor elements 55, 61, that is the received recording signals and the received monitoring signals, are prepared on a parallel analog branch 43 for display on the display monitor 43. The control picture shown on the display monitor 43 thus again shows a picture area which corresponds both to the central areal region 59 and to the frame-shaped areal region 63 of the sensor device 31. The control picture shown therefore allows a control of the region surrounding the actual recording area.

Alternatively to the embodiments shown in FIGS. 1 and 2, the received signals provided for the control reproduction on the display monitor 43 can also be branched at any other position of the signal processing chain. It is furthermore possible, on the one hand, to combine a low resolution signal, which corresponds to both the central areal region 59 and to the frame-shaped areal region 63 of the sensor device 31, with a high resolution signal, which only corresponds to the central areal region 59. In this case, a control picture can be produced by a corresponding picture generation circuit on the display monitor 43 which has a higher resolution in a central picture region than in a surrounding, frame-shaped picture region.

In the embodiment shown in each case in FIGS. 1 and 2, the sensor device 31 is formed by a CMOS sensor whose reception elements can be individually controlled in order to bring about a resetting or a subsequent read out of the photoelectric charge, or of a corresponding voltage signal, at any desired point in time.

In such a CMOS sensor, the light acting on a sensor element is transformed into a photoelectric charge and thereby, ultimately, into a voltage signal, whose value increases during the time of the light exposure. An individual sensor element can be short circuited and thus reset in order to set the voltage value to zero and thus to let the exposure period start at a defined point in time. The read-out of this sensor element can likewise take place at any desired defined point in time in order thus to receive a received signal which corresponds to a pre-determined exposure period. Since, therefore, both the starting point in time and the end point in time of the exposure period can be set as desired, ultimately the frequency at which the picture data sets of all sensor elements are jointly produced can also be varied, as will be explained in the following. The CMOS sensor 31 thus allows a variation of the picture recording frequency, which is not possible at a fixed read-out cycle—as with a CCD sensor for example.

In the sensor device 31 shown in FIGS. 1, 2 and 4, the control of the exposure time and of the picture taking frequency preferably takes place purely electronically. Alternatively or in support, however, it is also possible to influence the masking or light exposure of the sensor device 31 via a rotational diaphragm with at least one transmission aperture and one masking zone. The exposure time of the sensor device can be controlled, or additionally electro-mechanically supported with respect to an electronic control, by the rotational operation of such a rotational diaphragm.

It must still be mentioned with respect to the camera in accordance with FIGS. 1 and 2 that the sensor device 31, the amplifier device 32 and, preferably also, the digitizing device 33, can be realized by a single module. In this case, each sensor element has associated with in an integrated design its own amplifier or its own analog/digital converter. Furthermore, circuits for impedance matching can be provided.

The read-out, the amplification or the digitizing of the received signals of the sensor elements can moreover naturally also take place completely or partly sequentially. The amplifier device 32 and the digitizing device 33 then each only require a single signal amplifier or a single analog/digital converter in each case. It is, for example, also possible for ultimately only the received signals transmitted to the display monitor 43 to be transmitted purely sequentially, whereas the transmission of the received recording signals to the memory device 39 takes place, at least in part, in parallel via the data interface 37. In this case, the display monitor 43 can be disposed upstream of, for example, a multiplexer or a shift register.

It must still be mentioned with respect to the storage of the digital picture data that such a data format can be pre-set by the electronic control device 45 which does not only allow the storage of the digitized received signals of the sensor device 31, but also the additional storage of associated recording parameters. For example, the diaphragm aperture of the recording optical system 11 set by means of the camera control device 47, the brightness values detected by means of the camera sensor 49, a reference time signal pre-set by a clock (not shown) or the actual picture recording frequency can also be stored as recording parameters in the memory device 39.

A wireless connection, in particular a radio connection, can also be provided between the memory device 39 and the data interface 37 as well as between the display monitor 43 and the data interface 41 or the picture preparation circuit 42 instead of a wired connection.

In accordance with an advantageous further development of the motion picture camera shown in FIGS. 1 and 2, the frequency at which the individual sequential motion pictures are recorded by means of the sensor device 31 can be varied by interaction of the camera control device 47 and of the electronic control device 45 with the sensor device 31, and indeed in accordance with a pre-set value adjustable via the user interface and the camera control device 47. The picture recording frequency can thereby be reduced or increased continuously prior to or during a recording in order to carry out fast motion shots or slow motion shots. With such a variation of the picture recording frequency, the frequency at which the received signals of the sensor device 31 are read out which jointly form a picture data set is modified, for example, by means of the electronic control device 45

A sequential read-out of the received signals of these sensor elements 55, 61 shown in FIG. 4 can take place for example as follows: starting with the sensor element 61, which is shown at the top left in the representation in accordance with FIG. 4, initially all sensor elements 61 of the topmost line are reset sequentially from left to right and in defined intervals of time. In other words, the voltage values photoelectrically produced up to this time at these sensor elements 61 are set to zero.

Subsequently, the sensor elements 61, 55 of the second and following lines are reset in a corresponding manner, that is sequentially in each case from left to right, until finally the sensor element 61 at the bottom right is reached and is likewise reset or cancelled. After the resetting of each sensor element 55, 61, the production and collection of photoelectrical charge is directly begun—provided a light exposure takes place—such that, for example, a certain signal charge has been produced in the sensor element 61 at the top left at the point in time of the resetting of the sensor element 61 at the bottom right.

After such a sequential resetting of all sensor elements 55, 61, the received signals of these sensor elements are read out, and indeed again at defined points in time and in the explained order, that is line-wise from left to right starting with the sensor element 61 at the top left up to the sensor element 61 at the bottom right. A photoelectrical voltage value, or a received signal, is thereby read out for each sensor element 55, 61 and corresponds to a specific known exposure time. Such a sequential resetting and read-out of the sensor elements 55, 61 can be initiated, for example, by the electronic control device 45 in accordance with FIGS. 1 and 2.

Figure 5:
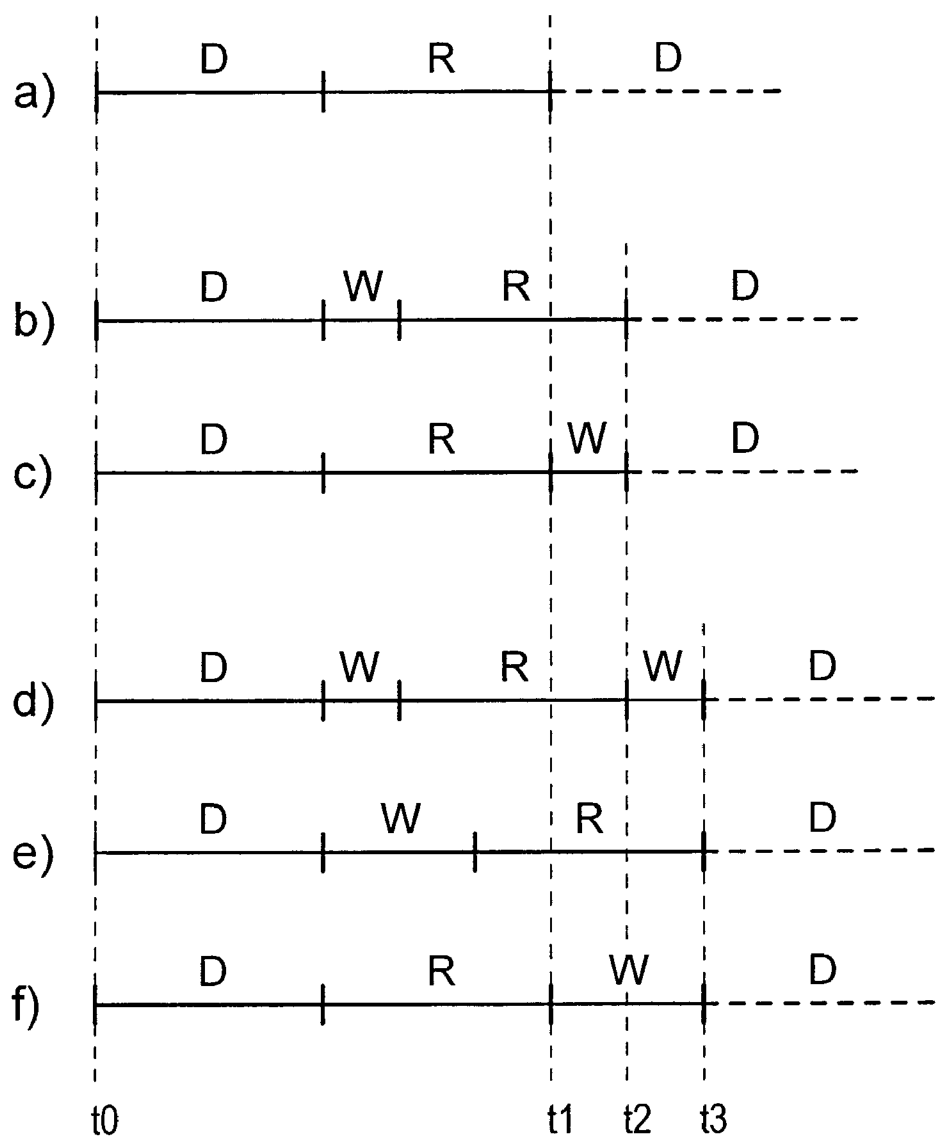
FIGS. 5 and 6 time diagrams for the illustration of different control sequences with different picture recording periods.

FIG. 5 shows in a time diagram how, with a sequential resetting and readout of sensor elements 55, 61 in accordance with FIG. 4, a variable picture recording frequency can be realized. Six possible control procedures (a) to (f) are shown by way of example, each beginning from a point in time t0. Cancellation intervals D, read-out intervals R and waiting intervals W are shown for these control procedures and each follow one another in a time sequence.

A cancellation interval D corresponds to the period of the sequential resetting of all sensor elements 55, 61, as explained with reference to FIG. 4. In a corresponding manner, a read-out interval R corresponds to the period of the sequential read-out of the sensor elements 55, 61 in accordance with FIG. 4. The cancellation intervals D and the read-out intervals R always have a constant period of time, provided that one is working with a constant resetting and read-out cycle.

The picture recording frequency and/or the exposure time can be varied in that one waits for the period of different waiting intervals W between a resetting procedure and a read-out procedure, or between a read-out procedure and a resetting period.

It is shown, for example, in FIG. 5 for the control sequence (b) that, after the sequential resetting of all sensor elements 55, 61 within the cancellation interval D, a waiting interval W initially passes before, during a readout interval R, the sensor elements 55, 61 are read out sequentially and directly subsequently, during a further cancellation interval D, are again reset sequentially. A complete picture recording cycle thereby takes up a period t2.

The same period t2 for a complete picture recording cycle is also required if the read-out interval R follows directly after the end of the cancellation interval D and if a waiting interval W only passes after this read-out before the sensor elements 55, 61 are again reset. This is shown in FIG. 5 for the control sequence (c).

The same period t2 of a complete picture recording cycle is thus required by the control sequences (b) and (c) such that in both cases the same picture recording frequency is achieved. However, the exposure time is extended in the control sequence (b) since a waiting interval W first passes before the read-out of the sensor elements 55, 61.

A longer period t3 of a complete picture recording cycle, and thus a reduced picture recording frequency, can be achieved in that the sensor device 31 is controlled such that longer and/or more waiting intervals W pass between the resetting and the read-out of the sensor elements 55, 61. This is shown by way of example for the control sequences (d), (e) and (f).

For example, in the control sequence (d), it is waited both before and after the sequential read-out of the sensor elements 55, 61 for the period of a waiting interval W, before again beginning with the read-out or resetting. The same exposure time is thereby achieved as in the control sequence (b), but with a reduced picture recording frequency.

The control sequence (e) in accordance with FIG. 5, in contrast, shows the passing of a longer waiting interval W after the end of the sequential resetting of all sensor elements 55, 61, with the resetting again being started directly after the subsequent read-out of the sensor elements. In this control sequence, the same period t3 of a complete picture recording cycle, and thus the same picture recording frequency, is achieved as with the control sequence (d). However, the exposure time is increased here due to the extended waiting interval W.

The same picture recording frequency is also achieved in the control sequence (f) as in the control frequencies (d) and (e). This comparatively low picture recording frequency is achieved at a short exposure time in that here a comparatively long waiting interval W passes between the ending of the read-out of the last sensor element 61 and the time of the resetting of the first sensor element 61.

The highest possible picture recording frequency corresponding to the shortest possible period t1 of a complete picture recording cycle results if the cancellation interval D and the read-out interval R follow directly after one another in each case without intermediate waiting intervals. This is shown as control sequence (a) in FIG. 5.

It must still be mentioned with respect to the control sequences shown in FIG. 5 that these can be realized purely electronically, namely by corresponding control of the sensor elements 55, 61 by means of the electronic control device 45 shown in FIGS. 1 and 2.

The period of the different waiting intervals W can, for example, be selected in increments of that high frequency cycle at which the sensor elements 55, 61 are sequentially reset or read out. However, it is also possible to provide variable periods for the waiting intervals W in order to be able to continuously change the picture recording frequency. It is likewise possible to variably control the high frequency cycle at which the sensor elements 55, 61 are sequentially reset or read out.

It must moreover be mentioned with respect to the explained control sequences that—due to the use of a CMOS sensor 31—the control of the sensor elements in accordance with FIG. 4 can also take place in any other desired order, for example starting with the sensor element 61, which is shown at the top right in the representation in accordance with FIG. 4, sequentially from right to left or from top to bottom, or completely freely selectably in order to achieve certain effects.

It is in particular possible to make a differentiation of the read-out type or of the read-out order according to the division of the sensor elements 55, 61 into the two areal regions 59 and 63 respectively. For example, a parallel read-out of the received recording signals and of received monitoring signals can be provided in each case independently of one another for the central areal region 59 and for the frame-shaped areal region 63, in particular via a respectively associated data interface.

Furthermore, alternatively to the purely sequential exposure of the sensor elements 55, 61 explained with reference to FIGS. 4 and 5, a so-called simultaneous shutter can be realized. For this, the received signals of all sensor elements 55, 61 in accordance with FIG. 4 can be reset simultaneously. Moreover, there is associated with each sensor element 55, 61 a memory element, for example in the form of a capacitor, into which the photoelectric charge produced in each case for the sensor element 55, 61 in question can be displaced, with the memory elements being connected or controllable such that no further increase of the respective received signal takes place in the memory elements after this charge transfer even with a further light exposure of the sensor 31. This charge transfer can also be carried out simultaneously for all sensor elements 55, 61.

Since both the starting point in time and the end point in time of the exposure is thus the same for all sensor elements 55, 61, the sensor elements are not subject to any phase shift relative to one another with respect to their respective exposure period.

After the simultaneous charge transfer, the read-out of the received signals, for example by taking up the voltage values applied at the memory elements, can take place in any desired order, for example, sequentially, in parallel in groups or completely in parallel. The sensor elements 55, 61 are subsequently again simultaneously reset.

A desired change in the picture recording frequency and/or in the exposure time can be realized in such a simultaneous shutter in that the starting point in time and/or the end point in time of the simultaneous exposure of the sensor elements 55, 61 can be varied. For example, it can be waited for the period of different waiting intervals W between the simultaneous resetting of all sensor elements 55, 61 and the simultaneous displacement of the photoelectrical charge into the memory elements, or between the simultaneous displacement and the simultaneous resetting.

Figure 6:
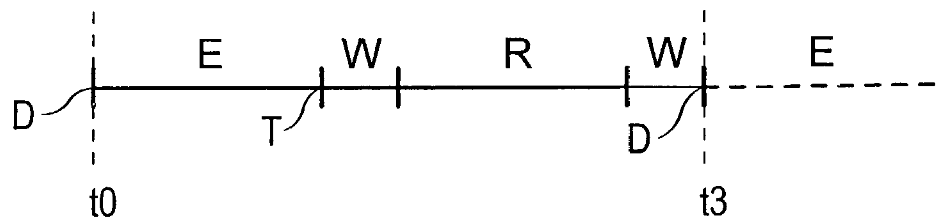

FIG. 6 shows such a simultaneous control sequence corresponding to the sequential control sequence (d) in accordance with FIG. 5 with respect to the period t3 of a picture recording cycle and thus with respect to the picture recording frequency.

The simultaneous resetting of all sensor elements 55, 61 is here triggered at a cancellation point in time D. During a subsequent exposure interval E, the sensor elements 55, 61 are exposed simultaneously. At a transfer point in time T, the photoelectric charges of the sensor elements 55, 61 are, as explained, simultaneously displaced into the respectively associated memory element. After the passing of a first waiting interval W, the memory elements are read out during a readout interval R. After the passing of a further waiting interval W, and indeed at a cancellation point in time D, the sensor elements 55, 61 are again simultaneously reset in order to initiate a new exposure interval E.

In a corresponding manner as explained in connection with FIG. 5, the waiting intervals W shown in FIG. 6 can respectively be varied, in particular lengthened, shortened or set to zero in order to vary the period t3 of a picture recording cycle, and thus the picture recording frequency and furthermore the exposure time E for all sensor elements 55, 61 synchronously.

REFERENCE NUMERAL LIST

11 recording optical system
13 reception beam path
31 sensor device
32 amplifier device
33 digitizing device
35 data bus
37 data interface
39 memory device
41 data interface
42 analog picture preparation circuit
43 display monitor
45 electronic control device
47 camera control device
49 camera sensor
55 sensor element
59 central areal region
61 sensor element
63 frame-shaped areal region
D cancellation interval or point in time
E exposure interval
R read-out interval
T transfer point in time
W waiting interval
t0, t1, t2, t3 point in time

The invention claimed is:

1. A digital motion picture camera, comprising:

an optoelectronic sensor device (31) for the recording of motion pictures, with the optoelectronic sensor device having, in an areal arrangement, a plurality of sensor elements (55, 61) for the production of a respective received signal in dependence on a light exposure, and with the optoelectronic sensor device being divided into a central areal region (59) and a frame-shaped areal region (63) which surrounds the central areal region (59);

a control device (45, 47) for the control of the read-out of the received signals of the sensor elements;

a digitizing device (33) for the digitizing of the received signals of the sensor elements, with a part of the sensor elements (55, 61) being associated with the central areal region (59) of the optoelectronic sensor device (31) for generating received recording signals and with another part of the sensor elements being associated with the frame-shaped areal region (63) for generating received monitoring signals, wherein the division of the sensor elements into the central areal region and the frame-shaped areal region is permanently fixed during a recording of motion pictures; and at least one display device (43) for the display of both the received recording signals and the received monitoring signals, wherein only the received recording signals are provided for transmission into a memory device (39), the at least one display device (43) being coupled to a picture generator by which a cutting frame signal can be generated for the representation of a cutting frame between the received recording signals and the received monitoring signals.

2. A digital motion picture camera in accordance with claim 1, characterized in that the display device (43) is integrated into the digital motion picture camera; and/or in that the display device (43) is connected to the digital motion picture camera via cable or via wireless transmission.

3. A digital motion picture camera in accordance with claim 1, characterized in that the display device (43) is formed for the display of the received recording signals and of the received monitoring signals in such an arrangement which corresponds to the division of the sensor elements (55, 61) into the central areal region (59) and into the frame-shaped areal region (63).

4. A digital motion picture camera in accordance with claim 1, characterized in that the sensor elements (55, 61) are coupled to the control device (45, 47) such that the received recording signals and the received monitoring signals can be read out separately.

5. A digital motion picture camera in accordance with claim 1, characterized in that an interface (37) is associated with the central areal region (59) for the transmission of the received recording signals to the memory device (39); and/or in that an interface (41, 42) is associated with the central areal region (59) for the transmission of the received recording signals to the at least one display device (43); and/or in that the interface (41, 42) is associated with the frame-shaped areal region (63) for the transmission of the received monitoring signals to the at least one display device (43).

6. A digital motion picture camera in accordance with claim 5, characterized in that the received recording signals and/or received monitoring signals to be transmitted to the at least one display device (43) can be reduced or compressed with respect to their data volume by means of the associated interface (41, 42).

7. A motion picture camera in accordance with claim 5, characterized in that the interface (42) provided for the transmission of the received recording signals and of the received monitoring signals to the display device (43) has an analog picture preparation circuit, with this interface (42) preferably being connected at the input side to an amplifier device (32) to which the interface (37) is also connected, at least indirectly, for the transmission of the received recording signals to the memory device (39).

8. A digital motion picture camera in accordance with claim 1, characterized in that the sensor elements (55, 61) are controllable for a freely selectable read out; and/or in that the association of the sensor elements (55, 61) with the central areal region (59) and with the frame-shaped central areal region (63) is variably pre-settable.

9. A digital motion picture camera in accordance with claim 1, characterized in that the optoelectronic sensor device (31) has a lower resolution within the frame-shaped areal region (63) than within the central areal region (59).

10. A digital motion picture camera in accordance with claim 9, characterized in that the optoelectronic sensor device (31) has a lower spatial resolution; brightness resolution;

color resolution; and/or temporal resolution in the frame-shaped areal region (63) than in the central areal region (59).

11. A digital motion picture camera in accordance with claim 9, characterized in that the extent of the central areal region (59) of the optoelectronic sensor device (31) corresponds to a central area of an optimized image of a recording optical system (11) of the digital motion picture camera.

12. A digital motion picture camera in accordance with claim 1, characterized in that the central areal region (59) of the optoelectronic sensor device (31) has a rectangular outer outline and the frame-shaped areal region (63) has a rectangular inner contour complementary thereto.

13. A digital motion picture camera in accordance with claim 1, characterized in that the optoelectronic sensor device (31) has a single optoelectronic sensor.

14. A digital motion picture camera in accordance with claim 1, characterized in that the sensor elements (55, 61) of the optoelectronic sensor device (31) are each provided with a color filter; and/or in that the sensor elements (55, 61) of the optoelectronic sensor device (31) are color resolving.

15. A digital motion picture camera in accordance with claim 1, characterized in that the optoelectronic sensor device (31) has a CMOS sensor.

16. A digital motion picture camera in accordance with claim 1, characterized in that the starting point in time of the exposure of the sensor elements (55, 61) and/or the end point in time of the exposure of the sensor elements is controllable by means of the control device (45, 47) for the variation of a picture recording frequency.

17. A digital motion picture camera in accordance with claim 1, characterized in that the sensor elements (55, 61) of the optoelectronic sensor device (31) can be controlled by means of the control device (45, 47) for a sequential resetting and for a subsequent sequential read-out.

18. A digital motion picture camera in accordance with claim 1, characterized in that the cycle of a sequential resetting or read-out of the received signals of the sensor elements (55, 61) is controllable for the variation of a picture recording frequency.

19. A digital motion picture camera in accordance with claim 1, characterized in that the sensor elements of the optoelectronic sensor device (31) are controllable by means of the control device (45, 47) for a parallel or a group-wise parallel resetting or read-out.

20. A digital motion picture camera in accordance with claim 1, characterized in that the picture recording frequency is variable continuously or in increments of a sensor element read-out cycle.

21. A digital motion picture camera in accordance with claim 1, characterized in that each sensor element (55, 61) has its own amplifier device (32) associated with it which is preferably integrated into the optoelectronic sensor device (31); and/or in that each sensor element (55) of the central areal region (59) has its own digitizing device (33) associated with it which is preferably integrated into the optoelectronic sensor device (31); and/or in that each sensor element (61) of the frame-shaped areal region (63) has its own digitizing device associated with it which is preferably integrated into the optoelectronic sensor device (31).

22. A digital motion picture camera in accordance with claim 1, characterized in that the exposure time of the optoelectronic sensor device (31) is electronically controllable by the control device (45, 47).

23. A digital motion picture in accordance with claim 1, characterized in that the exposure time of the sensor elements (55, 61) is controllable by the control device (45, 47) for each sensor element individually, for some of the sensor elements together, or for all sensor elements together.

24. A digital motion picture camera in accordance with claim 1, characterized in that the sensor elements (55, 61) are controllable for the sequential production of a plurality of received signals which correspond to different exposure times and are associated with a single motion picture.

25. A digital motion picture camera in accordance with claim 1, characterized in that a cooling device is provided for the active cooling of the optoelectronic sensor device (31), with the cooling device preferably having a Peltier element or a fan.

26. A digital motion picture camera in accordance with claim 1, characterized in that the digitizing device (33) is connected to at least one data interface (37) for the transmission of the digitized received signals to the memory device (39).

27. A digital motion picture camera in accordance with claim 1, characterized in that the memory device (39) is provided for the storage of the digitized received recording signals, with the memory device (39) preferably being capable of being coupled to the digital motion picture camera in an exchangeable manner.

28. A digital motion picture camera in accordance with claim 27, characterized in that the memory device (39) is controllable by the control device (45, 47) for the additional storage of at least one recording parameter.

29. A digital motion picture camera in accordance with claim 27, characterized in that a clock is provided for the making available of a time signal, with the storage of an actual time signal together with motion picture data or with a recording parameter being controllable by means of the control device (45, 47).

30. A digital motion picture camera in accordance with claim 27, characterized in that the memory device (39) has an identification device by which an identification code can be transmitted to the control device (45, 47).

31. A digital motion picture camera in accordance with claim 27, characterized in that the digital motion picture camera and the memory device (39) are designed for a wireless transmission of data to be stored, with the motion picture camera preferably having a wireless transmitter and the memory device (39) having a wireless receiver.

32. A digital motion picture camera in accordance with claim 27, characterized in that an intermediate memory device is provided for the recording of data to be stored and for the transmission of the data to the memory device (39).

33. A digital motion picture camera in accordance with claim 27, characterized in that the memory device (39) has at least one output interface for the outputting of stored data.

34. A digital motion picture camera in accordance with claim 27, characterized in that the memory device (39) for the outputting of stored data is controllable at a rate which is different to the rate of the reading in of data to be stored.

35. A digital motion picture camera in accordance with claim 27, characterized in that the memory device (39) has at least a magnetic memory, a magneto-optical memory, a semiconductor memory and/or an optical memory.

36. A digital motion picture camera in accordance with claim 1, characterized by a modular design, with the optoelectronic sensor device (31) together with the control device (45, 47), a recording optical system (11), and/or the memory device (39) each forming its own modular unit.

37. A digital motion picture camera in accordance with claim 1, characterized in that the optoelectronic sensor device (31) is controllable by means of the control device (45, 47) for the recording of the motion pictures at a pre-settable variable picture recording frequency.

38. A digital motion picture camera, comprising:

an optoelectronic sensor device (31) for the recording of motion pictures, with the optoelectronic sensor device having, in an areal arrangement, a plurality of sensor elements (55, 61) for the production of a respective received signal in dependence on a light exposure, and with the optoelectronic sensor device being divided into a central areal region (59) and a frame-shaped areal region (63) which surrounds the central areal region (59);

a control device (45, 47) for the control of the read-out of the received signals of the sensor elements;

a digitizing device (33) for the digitizing of the received signals of the sensor elements, with a part of the sensor elements (55, 61) being associated with the central areal region (59) of the optoelectronic sensor device (31) for generating received recording signals and with another part of the sensor elements being associated with the frame-shaped areal region (63) for generating received monitoring signals, wherein the division of the sensor elements into the central areal region and the frame-shaped areal region is permanently fixed during a recording of motion pictures;

at least one display device (43) for the display of both the received recording signals and the received monitoring signals, wherein only the received recording signals are provided for transmission into a memory device (39); and an interface (41, 42) associated with the central areal region (59) for the transmission of the received recording signals to a display device (43) and with the frame-shaped areal region (63) for the transmission of the received monitoring signals to the display device, wherein the received recording signals and the received monitoring signals to be transmitted to the display device (43) are reduced or compressed with respect to their data volume by means of the associated interface (41, 42).

* * * * *

UNITED STATES PATENT AND TRADEMARK OFFICE

CERTIFICATE OF CORRECTION

PATENT NO. : 7,738,010 B2
APPLICATION NO. : 10/355939
DATED : June 15, 2010
INVENTOR(S) : Kandleinsberger et al.

It is certified that error appears in the above-identified patent and that said Letters Patent is hereby corrected as shown below:

Title Page item 73 should read

"Arnold & Richter Cine Technik GmbH & Co. Betriebs KG"

Signed and Sealed this
Fifteenth Day of March, 2011

David J. Kappos
*Director of the United States Patent and Trademark Office*